(12) United States Patent
Ichikawa et al.

(10) Patent No.: US 8,709,282 B2
(45) Date of Patent: Apr. 29, 2014

(54) PROCESS FOR PRODUCING β-SIALON FLUORESCENT MATERIAL

(75) Inventors: Masayoshi Ichikawa, Tokyo (JP); Hironori Nagasaki, Tokyo (JP)

(73) Assignee: Denki Kagaku Kogyo Kabushiki Kaisha, Tokyo (JP)

( * ) Notice: Subject to any disclaimer, the term of this patent is extended or adjusted under 35 U.S.C. 154(b) by 143 days.

(21) Appl. No.: 13/500,450

(22) PCT Filed: Oct. 27, 2010

(86) PCT No.: PCT/JP2010/069078
§ 371 (c)(1),
(2), (4) Date: May 7, 2012

(87) PCT Pub. No.: WO2011/055665
PCT Pub. Date: May 12, 2011

(65) Prior Publication Data
US 2012/0211700 A1 Aug. 23, 2012

(30) Foreign Application Priority Data
Nov. 5, 2009 (JP) .................................. 2009-254479

(51) Int. Cl.
*C09K 11/64* (2006.01)
(52) U.S. Cl.
USPC .................................................. 252/301.4 F
(58) Field of Classification Search
USPC .................................................. 252/301.4 F
See application file for complete search history.

(56) References Cited

U.S. PATENT DOCUMENTS

2007/0108896 A1   5/2007   Hirosaki

FOREIGN PATENT DOCUMENTS

| EP | 1 964 905 A1 | 9/2008 |
|---|---|---|
| EP | 2 093 272 A1 | 8/2009 |
| JP | 10-036833 | 2/1998 |
| JP | 2000-034477 | 2/2000 |
| JP | 2005-255885 | 9/2005 |
| JP | 2005-255895 | 9/2005 |
| JP | 2008-050462 | 3/2008 |
| JP | 2008-255200 | 10/2008 |
| WO | WO 2006/087661 A1 | 8/2006 |

OTHER PUBLICATIONS

International Search Report issued in International Application No. PCT/JP2010/069078 on Dec. 21, 2010.
European Search Report issued from the European Patent Office in the corresponding European Application No. 10828225.2-1355 on Nov. 19, 2013.

*Primary Examiner* — Carol M Koslow
(74) *Attorney, Agent, or Firm* — Stein IP, LLC

(57) ABSTRACT

Provided is a production method of a β-type sialon fluorescent substance, where luminescence intensity can be improved without adding a metal element other than elements composing a β-type sialon fluorescent substance. Namely, in a production method of a fluorescent substance containing an optically-active element as the luminescence center in a crystal of nitride or acid nitride, a β-type sialon fluorescent substance is produced by a burning process for heat-treating a mixture including metal compound powder and an optically-active element compound; a high-temperature annealing process for heat-treating the burned product after cooling under a nitrogen atmosphere; a rare-gas annealing process for heat-treating the high-temperature annealed product under a rare gas atmosphere; and a process for treating the rare-gas treated product with an acid.

6 Claims, 8 Drawing Sheets

FIG. 1

Raw Material → Burning → Cooling → High-temperature anneal → Rare-gas anneal → Acid treatment

PROCESS FOR PRODUCING β-SIALON FLUORESCENT MATERIAL

CROSS-REFERENCE TO RELATED APPLICATIONS

This application is a National Phase of PCT International Patent Application No. PCT/JP2010/069078, filed Oct. 27, 2010, and claims priority benefit to Japanese Patent Application No. 2009-254479, filed Nov. 5, 2009, in the Japanese Patent Office, the disclosures of which are incorporated herein by reference.

BACKGROUND OF THE INVENTION

1. Field of the Invention

The present invention relates to a production method of a β-type sialon fluorescent substance.

2. Description of the Related Art

Light-emitting devices combined with a light-emitting element emitting a primary light and a fluorescent substance absorbing the primary light and emitting a secondary light have been drawing attentions as a next-generation light-emitting device being expected to have low power consumption, miniaturization, high brightness and extensive color reproducibility, and they have actively been researched and developed.

For example, there is disclosed a white LED obtaining white light by color mixture of light emitted by the semiconductor light-emitting element and wavelength-converted light by the fluorescent substance, by combining a semiconductor light-emitting element emitting a visible light of short wavelength from blue to purple with a fluorescent substance.

As output of a white LED increases, heat stability and durability of a fluorescent substance have been demanded more than ever, and a fluorescent substance which is low in deterioration of luminescence intensity due to temperature rise and excellent in durability has been required, so a fluorescent substance of nitride or acid nitride typified by a β-type sialon fluorescent substance whose crystal structure is stable has been drawing attentions.

It has been known that a β-type sialon fluorescent substance is obtained by mixing silicon nitride ($Si_3N_4$), aluminum nitride (AlN) and an optically-active element compound such as europium oxide ($Eu_2O_3$) in a predetermined mole ratio, then burning it at a temperature near 2000° C., and grinding the resulting burned product, or produced by further acid treatment of the burned product obtained (Patent document 1).

However, since the β-type sialon fluorescent substance obtained by the above-described method is low in luminescence intensity, in the case of a white LED obtained by combination with a semiconductor light-emitting element, there is pointed out a problem that the light-emitting efficiency is low.

In order to improve the luminescence intensity of a β-type sialon fluorescent substance, there is a proposition that before burning, fluoride, chloride, iodide or bromide of an element selected from Li, Na, K, Mg, Ca, Sr and Ba, or phosphate is added (Patent document 2). This method aimed to improve reactivity in burning and promote the growth of crystal grain by adding the above-described compound.

CITATION LIST

Patent Literature

[PTL 1] Japanese Unexamined Patent Application Publication No. 2005-255885

[PTL 2] Japanese Unexamined Patent Application Publication No. 2005-255895

SUMMARY OF THE INVENTION

However, according to the method described in Patent document 2, since metal elements other than elements composing a β-type sialon fluorescent substance are included in burning, it is pointed out that formation of a hetero-phase different from β-type sialon crystal, such as α-type sialon crystal, tends to occur. In particular, in the case that alkaline earth metals such as Ca and Mg are included in burning, as a result, it cannot obtain a sufficient improvement effect of luminescence intensity, which is not preferable.

The present invention aims to improve luminescence intensity without adding a metal element other than elements composing a β-type sialon fluorescent substance.

The present inventors have keenly studied for increasing the luminescence intensity of a β-type sialon fluorescent substance, as a result, found out that the luminescence intensity becomes strong by conducting a heat treatment under a nitrogen atmosphere and a heat treatment under a rare gas atmosphere after burning, and completed the present invention.

In a production method of a fluorescent substance containing an optically-active element as the luminescence center in a crystal of nitride or acid nitride, the present invention provides a production method of a β-type sialon fluorescent substance comprising a burning process for heat-treating a mixture including silicon nitride, aluminum compound powder and an optically-active element compound; a high-temperature annealing process for heat-treating the burned product after cooling under a nitrogen atmosphere; and a rare-gas annealing process for heat-treating the high-temperature annealed product under a rare gas atmosphere.

In a production method of a fluorescent substance containing an optically-active element as the luminescence center in a crystal of nitride or acid nitride, the present invention also provides a production method of a β-type sialon fluorescent substance comprising a nitriding process for heating a mixture including silicon, aluminum compound powder and an optically-active element compound under a nitrogen atmosphere; a burning process for heat-treating the nitrided metal compound and the optically-active element compound; a high-temperature annealing process for heat-treating the burned product after cooling under a nitrogen atmosphere; a rare-gas annealing process for heat-treating the high-temperature annealed product under a rare gas atmosphere; and a process for treating the rare-gas treated product with an acid.

In these production methods of a β-type sialon fluorescent substance, it is preferable that the heat treatment temperature in the high-temperature annealing process is a temperature lower than the heating temperature in the burning process. It is preferable that the heat treatment temperature in the rare-gas annealing process is a temperature lower than the heating temperature in the burning process.

According to the production method of a β-type sialon fluorescent substance of the present invention, luminescence intensity can be improved by heat treatments under a nitrogen atmosphere and under a rare gas atmosphere after burning.

Further, the fluorescent substance of the present invention shows an excellent characteristic in comparison with the conventional β-type sialon fluorescent substance in regard to brightness and color reproducibility when used for a light source of back light in an image display apparatus such as LCD. Such fluorescent substance can be suitably used in a semiconductor light-emitting device, and the semiconductor light-emitting device can be suitably used in an image display apparatus.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 1 is a flow diagram for explaining procedures in a production method of a β-type sialon fluorescent substance according to a first embodiment of the present invention.

DETAILED DESCRIPTION OF THE EMBODIMENTS

Figure 2:
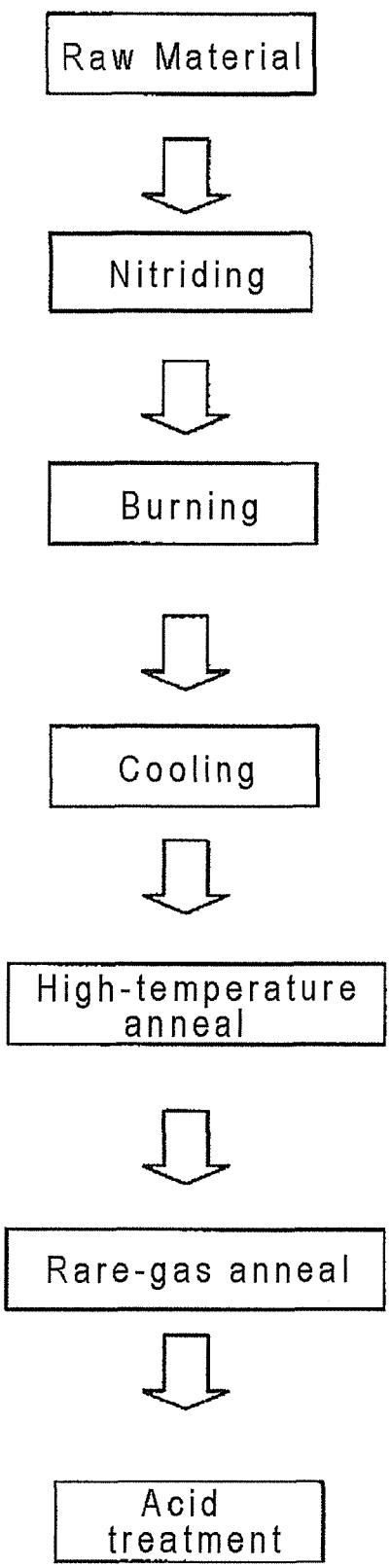
FIG. 2 is a flow diagram for explaining procedures in a production method of a β-type sialon fluorescent substance according to a second embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

(First Embodiment)

The production method of a β-type sialon fluorescent substance according to a first embodiment of the present invention is characterized by comprising a burning process for heat-treating a mixture including silicon nitride, an aluminum compound and an optically-active element compound; a high-temperature annealing process for heat-treating the burned product after cooling under a nitrogen atmosphere; and a rare-gas annealing process for heat-treating the high-temperature annealed product under a rare gas atmosphere. The outline of treatment flow is shown in FIG. 1.

The aluminum compound means at least one kind of aluminum compound selected from aluminum nitride, aluminum oxide, or an aluminum-containing compound producing aluminum oxide through decomposition by heating.

The optically-active element compound is a compound of one kind, or more than one kind of elements selected from the group consisting of Mn, Ce, Pr, Nd, Sm, Eu, Tb, Dy, Ho, Er, Tm, and Yb, and preferably oxide thereof. These elements function as the luminescence center and exhibit fluorescent characteristics. An element commonly used as a fluorescent substance emitting yellow light by irradiation of blue light is europium oxide.

The burning process is conducted by heating under a nitrogen atmosphere or under a nonoxidative condition in accordance with conditions of the standard method. The heating temperature is preferably in a range of 1850 to 2050° C. When a heating temperature is not less than 1850° C., $Eu^{2+}$ can enter into a β-type sialon crystal, thereby a fluorescent substance having sufficient luminescence intensity is obtained. When a heating temperature is not more than 2050° C., it is industrially preferable because there is no need to restrain the decomposition of β-type sialon by loading a very high nitrogen pressure, therefore no need for special equipment.

Next, after the burned product is cooled, it undergoes heat treatment under a nitrogen atmosphere. Hereinafter, the heat treatment under a nitrogen atmosphere after cooling is called a high-temperature annealing process.

Cooling is slowly conducted in such a manner that the burned product is allowed to stand until its temperature becomes room temperature or lower. Without cooling, it is not possible to improve the luminescence intensity of a β-type sialon fluorescent substance sufficiently.

The burned product becomes granular or clumpy, thus after cooling, it may be converted to powder with a predetermined size by crushing, grinding and/or combination with a classification operation. As an example of the specific treatment, there is listed a method that a burned product undergoes a sieve-classification treatment in a range of 20 to 45 μm opening to obtain powder passed through the sieve, or a method that a synthetic is ground to a predetermined particle size using a common grinder such as ball mill, vibration mill and jet mill. In regard to grinding by a jet mill, in the case of adopting an excessive treatment condition, there is a case that crystal defects occur on the particle surface causing the lowering of light-emitting efficiency. In the case of using a grinder, it is preferable for the grinding condition to be milder.

The heating temperature in the high-temperature annealing process is preferably in a range of 1700 to 1900° C. When the heating temperature becomes not less than 1900° C., it is not preferable because of decomposition of β-type sialon and evaporation of Eu being the luminescence center. When the heating temperature becomes not more than 1700° C., it is not preferable because crystallizability cannot be improved sufficiently. The pressure condition is preferably 0.1 MPa or more. In the case of 0.1 MPa or less, it is not preferable because decomposition of β-type sialon occurs.

After the high-temperature annealing process, a treated product obtained in the high-temperature annealing process is subjected to heat treatment under a rare gas atmosphere. This process is called a rare-gas annealing process. The treated product in the high-temperature annealing process is cooled to near room temperature in the same manner as the burned product or powder of the burned product, and subjected to heat treatment in the rare-gas annealing process. Fluorescence characteristics are improved by conducting the rare-gas annealing process along with the high-temperature annealing process.

The heating temperature in the rare-gas annealing process is in a range of 1300 to 1500° C., and the range of 1300 to 1500° C. is particularly preferable. When it is 1300° C. or more, destabilization of low crystalline part is possible, and when 1500° C. or less, it is possible to restrain the decomposition of crystal structure of a β-type sialon fluorescent substance.

Regarding rare gas, there can be used one kind of gas selected from He, Ne, Ar, Kr, Xe and Rn, or a mix gas of two kinds or more thereof. In particular, Ar gas is preferable.

Based on the studies of the present inventors, the heat treatment in rare gas anneal is a treatment for destabilizing a low crystalline part in a fluorescent substance. By heat treatment in a rare gas atmosphere, the low crystalline part is destabilized, and this is removed by an acid treatment process of the next process. Additionally, it is desirable that the particle size of powder is sorted by a sieve before the acid treatment process.

Next, unstable low crystalline parts generated in the rare-gas annealing process, and phases different from a β sialon fluorescent substance are treated with an acid, and removed (hereinafter, referred to as an acid treatment process). Acid treatment can be carried out by a heat treatment with a mix acid of hydrofluoric acid and nitric acid, for example. Fluorescent characteristics are greatly improved by removing low crystalline parts. Regarding the heat treatment temperature, a dissolving treatment by a mixture of hydrofluoric acid and nitric acid heating at 60° C. or more for 5 minutes or more is effective and preferable.

Dispersion liquid of the β-type sialon fluorescent substance obtained by the acid treatment is washed with water and dried to obtain fluorescent substance powder. Further, minute powders may be removed by a wet precipitation method and the like of the fluorescent substance powder.

(Second Embodiment)

The difference from the first embodiment is as follows: in the second embodiment, silicon is used in place of silicon nitride, and a nitriding treatment is conducted before burning a mixture including at least one kind of aluminum compound selected from aluminum nitride, aluminum oxide or an aluminum-containing compound producing aluminum oxide through decomposition by heating, and an optically-active element compound.

FIG. 2 shows the outline of treatment flow of a β-type sialon fluorescent substance according to the second embodiment of the present invention. Namely, it is a production method of a β-type sialon fluorescent substance comprising a nitriding process for heating a mixture including metal compound powder and an optically-active element compound under a nitrogen atmosphere; a burning process for heat-treating a nitrided metal compound and an optically-active element compound; a high-temperature annealing process for heat-treating the burned product after cooling under a nitrogen atmosphere; a rare-gas annealing process for heat-treating the high-temperature annealed product under a rare gas atmosphere; and a process for treating the rare-gas treated product with an acid.

The nitriding treatment process is a treatment for nitriding silicon, and it may be conducted by heating under a nitrogen atmosphere in accordance with nitriding treatment conditions of the standard method. Namely, for converting silicon into $Si_3N_4$ by nitriding, it is heated at 1200 to 1550° C. The heating temperature is preferably in a range of 1450 to 1500° C. When the heating temperature is 1450° C. or more, $Eu^{2+}$ can enter into a β-type sialon crystal, thereby obtaining a fluorescent substance having sufficient luminescence intensity. When preheating temperature exceeds 1500° C., luminescence wavelength of the fluorescent substance finally obtained becomes long, and when pressure exceeds 0.5 MPa, luminescence wavelength of the fluorescent substance finally obtained becomes long, which became clear from the research of the present inventors. Therefore, it is preferable to be conducted at 1500° C. or less, and under a pressure condition of 0.5 MPa.

The treatment conditions of the burning process, high-temperature annealing process, rare-gas annealing process and acid treatment are the same as those in the first embodiment. In the same way as in the first embodiment, dispersion liquid of the β-type sialon fluorescent substance obtained by the acid treatment is washed with water and dried to obtain fluorescent substance powder, further, minute powders may be removed by a wet precipitation method and the like of the fluorescent substance powder.

EXAMPLES

Hereinafter, the present invention will be described further in detail based on Examples and Comparative Examples.

Example 1

(1) Preparation of Raw Material Powder for Eu-containing β Sialon

There were compounded 95.5 mass % of α-type silicon nitride powder (manufactured by Ube Industries, Ltd., "SN-E10" grade, oxygen content 1.1 mass %), 3.3 mass % of aluminum nitride powder (manufactured by Tokuyama Corporation "F" grade, oxygen content 0.9 mass %), 0.4 mass % of aluminum oxide powder (manufactured by Taimei Chemicals Co., Ltd., "TM-DAR" grade), and 0.8 mass % of europium oxide powder (manufactured by Shin-Etsu Chemical Co., Ltd., "RU" grade), thereby obtaining a raw material mixture of 1 kg.

The raw material mixture was dry-mixed for 30 minutes using a V-type mixing machine, further it was all passed through a sieve made of nylon with 150 μm opening to obtain raw material powder for synthesizing a fluorescent substance.

(2) Burning Process

The raw material powder of 170 g was filled in a cylindrical container made of boron nitride of inner diameter 10 cm×height 10 cm with a lid (manufactured by Denki Kagaku Kogyo Kabushiki Kaisha, "N-1" grade), it was heat-treated in an electric furnace with a carbon heater in a pressured nitrogen atmosphere of 0.9 MPa at 2000° C. for 15 hours, then the resulting powder was slowly cooled to room temperature. The burned product obtained was clumpy and loosely aggregated, and it was able to be flaked gently by a hand wearing a clean rubber glove. In this way, after being crushed to a slight degree, it was passed through a sieve of 150 μm opening. By these operations, synthesized powder of 160 g was obtained.

Figure 3:
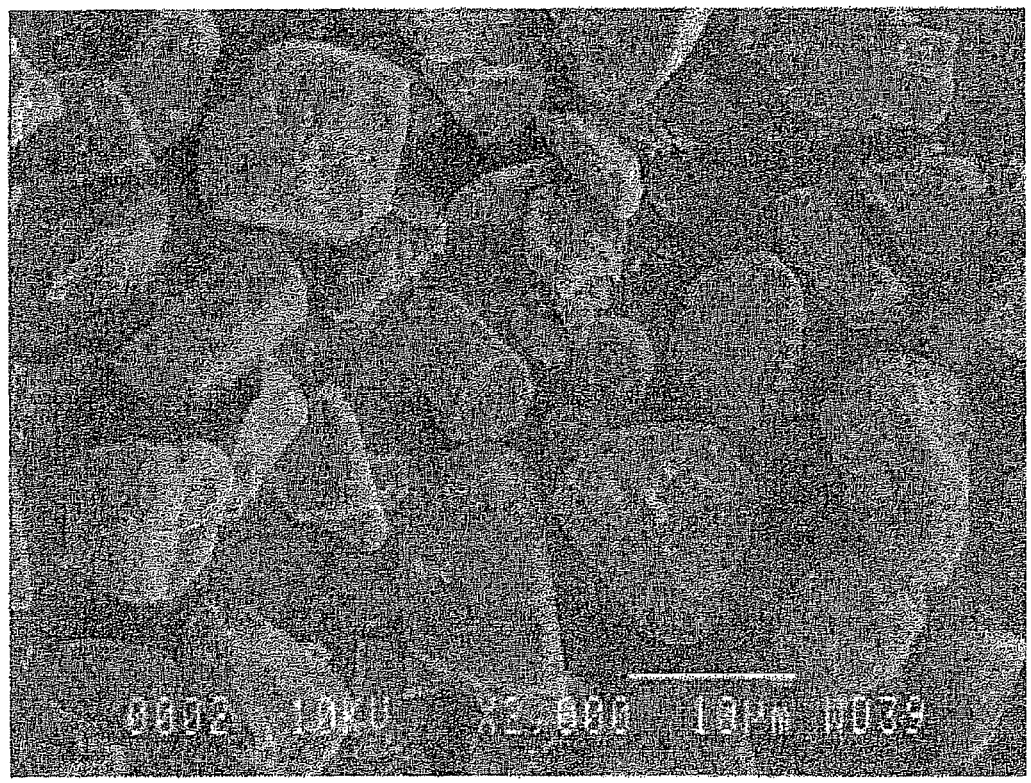
FIG. 3 is a diagram showing a scanning electron microscope (SEM) picture of fluorescent substance powder ground by ultrasonic jet in Example 1.

The synthesized powder was crushed by an ultrasonic jet grinder (manufactured by Nippon Pneumatic Mfg. Co., Ltd., PJM-80SP) to obtain the ground powder. FIG. 3 shows a scanning electron microscope (SEM) picture of the ground powder obtained. Additionally, this grinder can control the particle diameter of the ground powder by a sample-feeding speed into a grinding room and a grinding air pressure.

(3) High-temperature Annealing Process

The ground powder of 70 g was filled in a cylindrical container made of boron nitride of diameter 70 mm×height 45 mm with a lid (manufactured by Denki Kagaku Kogyo Kabushiki Kaisha, "N-1" grade), and it was heat-treated in an electric furnace with a carbon heater in a pressured nitrogen atmosphere of 0.9 MPa at 1900° C. for 8 hours. The resulting powder was all passed through a sieve of 45 μm opening.

(4) Rare Gas Process

The resulting powder of 15 g was filled in a cylindrical container made of boron nitride of diameter 40 mm×height 45 mm with a lid (manufactured by Denki Kagaku Kogyo Kabushiki Kaisha, "N-1" grade), and it was heat-treated in an electric furnace with a carbon heater in an argon atmosphere of atmospheric pressure at 1450° C. for 8 hours. The resulting powder had no shrinkage associated with burning, it was almost the same aspect as that before heating, and all passed through a sieve of 45 μm opening. Additionally, in the following description, heat treatment using argon gas in the rare gas process is called an argon annealing process.

(5) Acid Treatment Process

Figure 4:
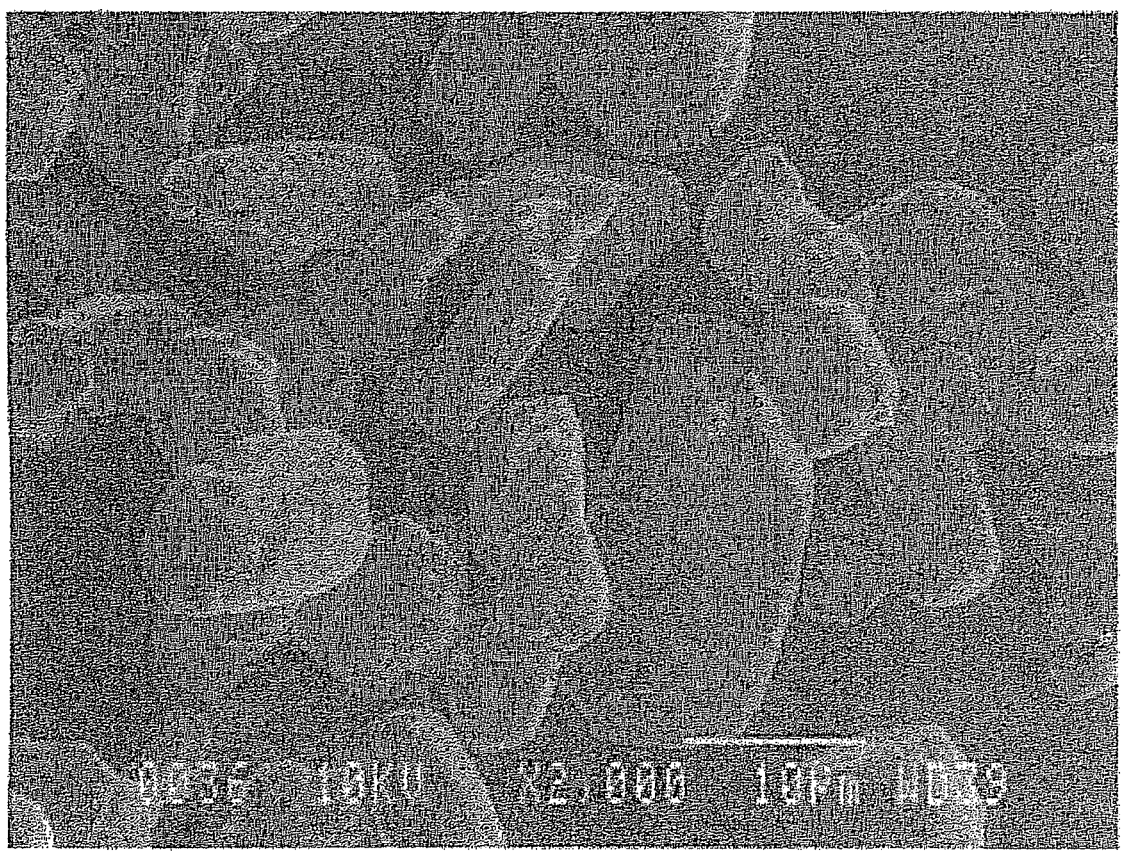
FIG. 4 is a diagram showing a scanning electron microscope (SEM) picture of fluorescent substance powder after acid treatment in Example 1.

The powder was treated in a mix acid of 50% hydrofluoric acid and 70% nitric acid by 1:1. The suspension liquid was changed during the treatment from deep green to vivid green. Thereafter, β-type fluorescent substance powder was obtained by washing with water and drying. FIG. 4 shows a scanning electron microscope (SEM) picture.

The resulting β-type fluorescent substance powder was subjected to a minute powder removing treatment by a wet precipitation method.

The fluorescent substance powder of 10 g was dispersed sufficiently in 500 mL of distilled water where sodium hexametaphosphate had been added as a dispersing agent, then the mixture was transferred to a container of 80 mm in inner diameter and 140 mm in height, allowed to stand still for 50 minutes, and supernatant solution of 90 mm from the water surface was removed. Hexametaphosphoric acid aqueous solution was added again and dispersed, and the mixture was allowed to stand still for a predetermined time, then supernatant solution was removed, and such operation was repeated until supernatant solution became transparent. Thereafter, precipitate was collected by filtration, and washed sufficiently with water to remove the dispersing agent, and dried to obtain β-type fluorescent substance powder from which minute powders were removed.

Comparative Example 1

The treatment was conducted to obtain fluorescent substance powder in the same treatment process and condition as in Example 1 except that a high-temperature annealing process was omitted. Namely, β-type fluorescent substance powder was produced by a method including "burning process," "argon annealing process," and "acid treatment process." FIG. 5 shows a scanning electron microscope (SEM) picture after acid treatment.

Figure 5:
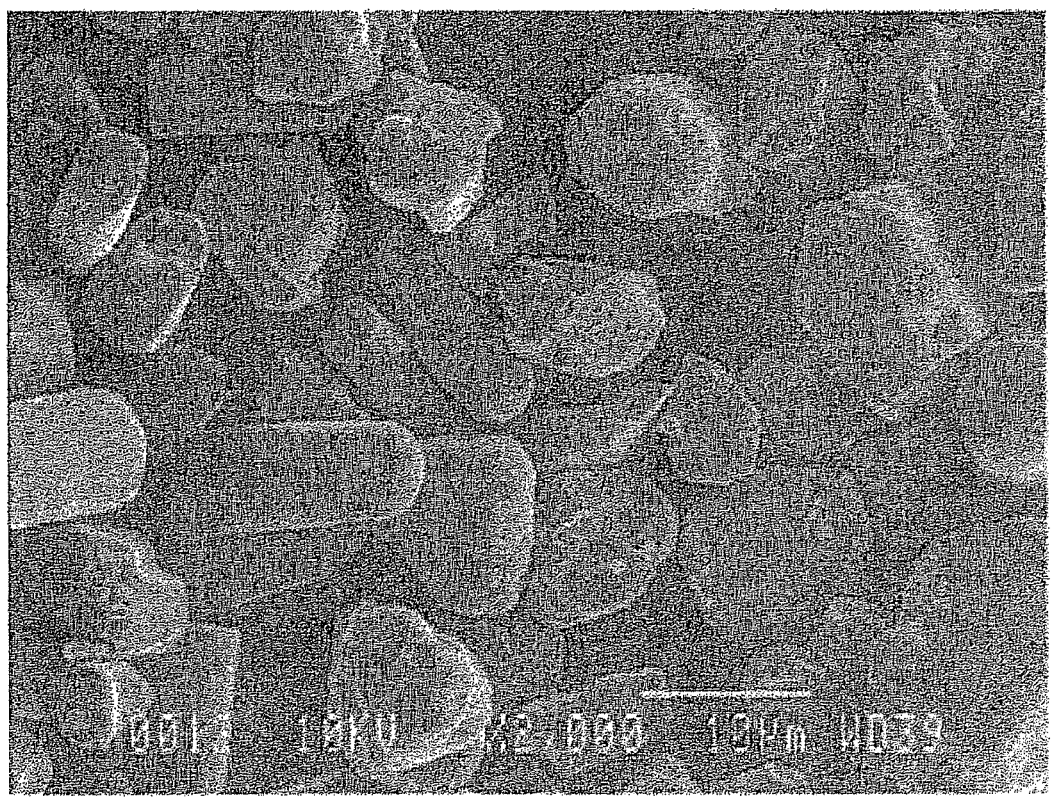
FIG. 5 is a diagram showing a scanning electron microscope (SEM) picture of fluorescent substance powder after acid treatment in Comparative Example 1.

It can be seen that a β-type fluorescent substance powder particle (Example 1) shown in FIG. 4 has a more roundish surface than a β-type fluorescent substance powder particle (Comparative Example 1) of FIG. 5.

Figure 6:
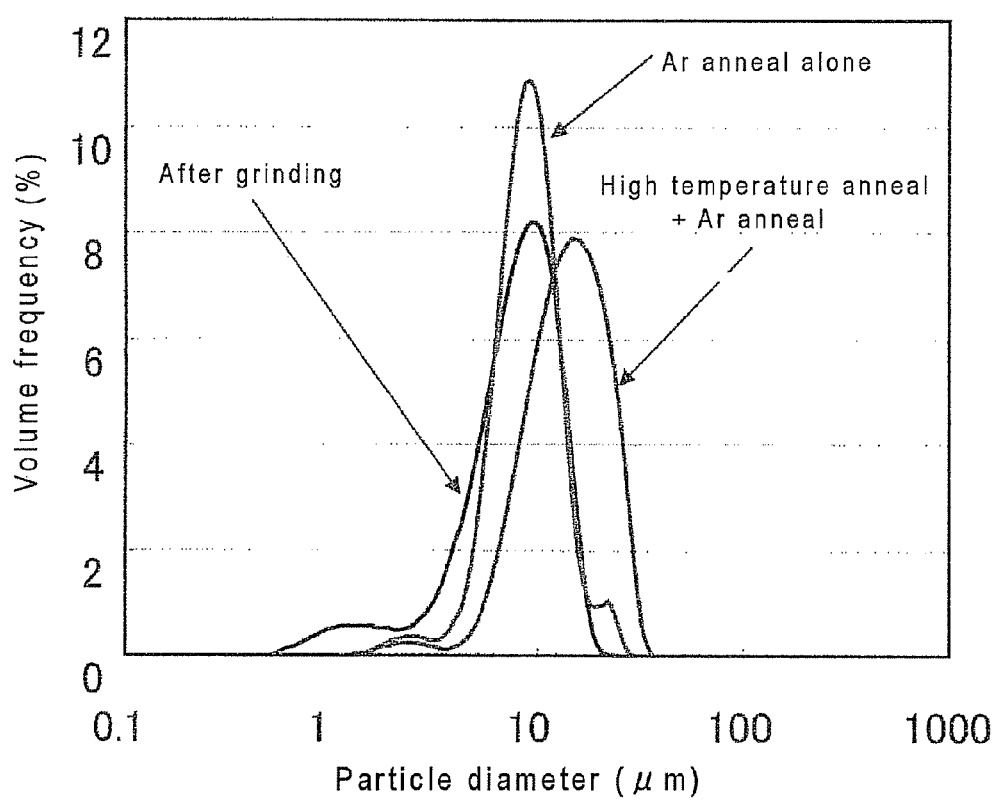
FIG. 6 is a graph showing the particle size distribution of fluorescent substance powder in Example 1 and Comparative Example 1.

Particle sizes of the ground powder ground by an ultrasonic jet, β-type fluorescent substance powder after acid treatment of Example 1, and β-type fluorescent substance powder after acid treatment of Comparative Example 1 were measured using a particle size distribution measuring apparatus of a laser diffraction scattering method (Beckman Coulter LS230). The particle size distribution is shown in FIG. 6. It can be seen that the particle diameter becomes larger by conducting both high-temperature annealing process and argon annealing process than that by an argon annealing process alone.

In regard to the β-type fluorescent substance powder obtained after each process in Example 1 and Comparative Example 1, the amount of crystal defects was measured using an electron spin resonator (ESR). The measuring results are shown in Table 1 and FIG. 7.

TABLE 1

| Sample name | Amount of crystal defects (spins/g) | Amount of Eu$^{2+}$ (a.u.) |
| --- | --- | --- |
| Burned powder | 2.48E+17 | 62.99 |
| Jet-milled powder | 3.45E+17 | 68.37 |
| Acid-treated powder (only argon anneal) | 9.03E+16 | 64.63 |
| Acid-treated powder (high-temperature treatment + argon anneal) | 6.20E+16 | 62.41 |

Figure 7:
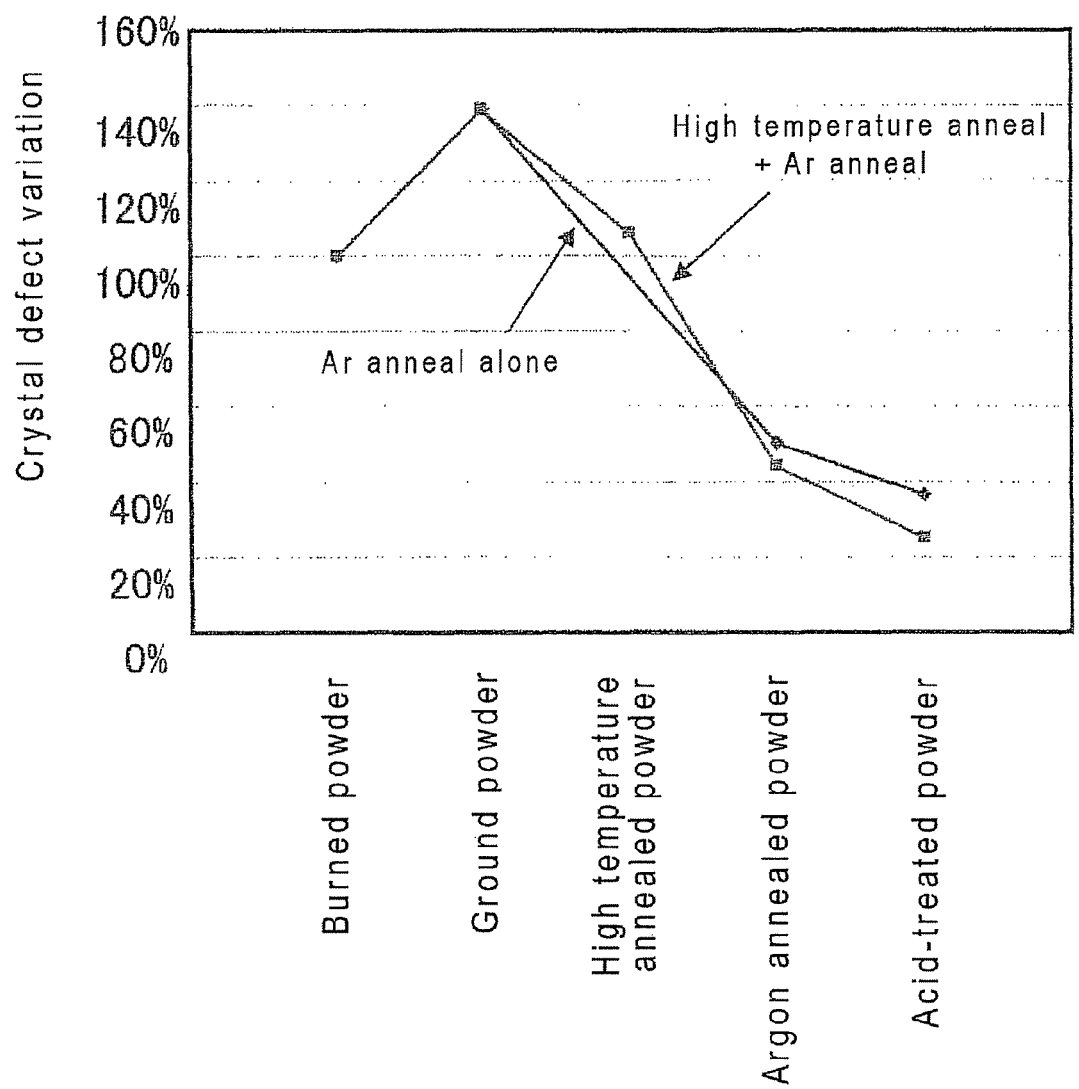
FIG. 7 is a graph showing the variation of crystal defects for each process in Example 1 and Comparative Example 1.

From Table 1 and FIG. 7, it can be seen that the amount of crystal defects can be decreased by an argon annealing process alone. Moreover, by conducting both high-temperature annealing process and argon annealing process, it can be seen that the amount of crystal defects can be further decreased. The decreasing effect on the amount of crystal defects by conducting the high-temperature annealing process in addition to the argon annealing process became more remarkable particularly after acid treatment. On the other hand, there was no significant change in the amount of europium.

The elemental compositions of the β-type fluorescent substance powder after acid treatment of Example 1 and of the β-type fluorescent substance powder after acid treatment of Comparative Example 1 were measured. For measurement of oxygen, oxygen/nitrogen analysis equipment (manufactured by Horiba, Ltd., EMGA-920) was used. For measurement of europium, aluminum and silicon, a high-frequency inductive coupled plasma emission spectrophotometer (Spectro Corporation, Ciros) was used. The results are shown in Table 2.

TABLE 2

| Sample | Argon anneal alone | High-temperature anneal + argon anneal |
| --- | --- | --- |
| Amount of O (wt %) | 1.11 | 1.00 |
| Amount of Eu (wt %) | 0.41 | 0.48 |
| Amount of Al (wt %) | 1.95 | 2.06 |
| Amount of Si (wt %) | 58.3 | 62.2 |

It can be seen that via high-temperature annealing process and argon annealing process, the amount of oxygen is decreased in comparison with an argon annealing process alone.

Luminescence intensity of the β-type fluorescent substance powder obtained in Example 1 and Comparative Example 1 was measured by a fluorescence spectrophotometer (manufactured by Hitachi High-Technologies Co., Ltd., "F4500"). The luminescence intensity was evaluated as follows. Fluorescent substance powder was first filled in a concave cell such that the surface becomes flat, and an integrating sphere was equipped. To this integrating sphere, monochromatic light dispersed into a predetermined wavelength was introduced via optical fiber from a luminous source (Xe lamp). This monochromic light was used as an excitation source, a fluorescent substance sample was irradiated, and spectra of fluorescent light and reflected light of the sample were measured using a spectrophotometer. In the present Example, blue light of 455 nm wavelength was used as monochromatic light. Additionally, the luminescence intensity was expressed by a relative peak strength (%) when luminescence intensity of YAG:Ce (P46Y3; Kasei Optonix Co., Ltd.) was 100%. The results are shown in Table 3 and FIG. 8.

TABLE 3

| Excitation wavelength: 455 nm | Example 1 | Comparative Example 1 |
|---|---|---|
| Relative peak strength (%) | 221 | 203 |

Figure 8:
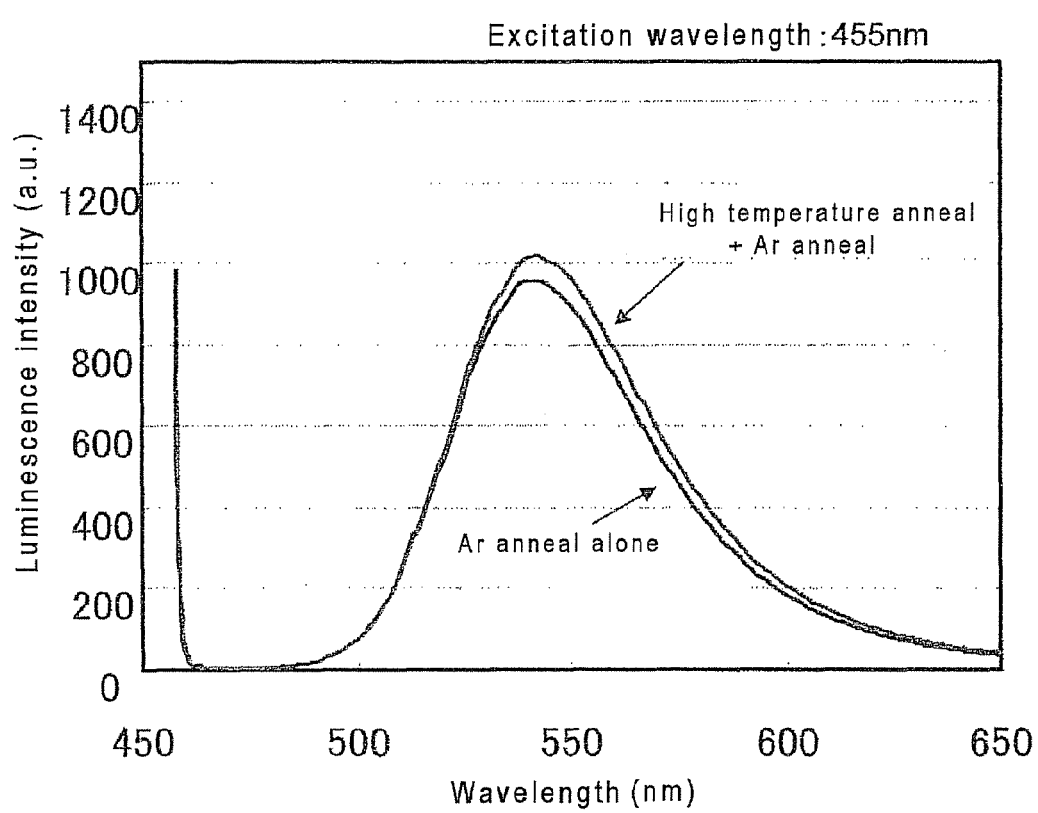
FIG. 8 is a graph showing the luminescence intensity of fluorescent substance powder in Example 1 and Comparative Example 1.

From Table 3 and FIG. 8, it can be seen that luminescence intensity is improved by conducting the high-temperature annealing process and argon gas process together.

Example 2

There is shown an example where silicon powder was used in Example 2 in place of silicon nitride powder of Example 1.

(1) Preparation of Raw Material Powder for Eu-containing β Sialon

Using a mortar and a pestle made of silicon nitride burned substance, there were mixed 96.41 mass % of silicon powder (purity 99.999% or more, −45 μm, manufactured by Pure Chemical Co., Ltd.), 1.16 mass % of aluminum nitride powder (manufactured by Tokuyama Corporation, E grade), and 2.43 mass % of europium oxide powder (manufactured by Shin-Etsu Chemical Co., Ltd., RU grade), and further all passed through a sieve of 250 μm opening for removing aggregation, thereby to obtain raw material-mixed powder.

(2) Nitriding Process

The raw material-mixed powder was filled in a cylindrical container made of boron nitride of diameter 40 mm×height 30 mm with a lid (manufactured by Denki Kagaku Kogyo Kabushiki Kaisha, "N-1" grade), and it was heat-treated in an electric furnace with a carbon heater in a pressured nitrogen atmosphere of 0.48 MPa at 1550° C. for 8 hours. Additionally, the rate of temperature increase in heating was set to 20° C./min from room temperature to 1200° C. and 0.5° C./min from 1200 to 1500° C. The resulting product was clumpy, and this was ground using a mortar and a pestle made of silicon nitride burned substance. The ground powder was classified by a sieve of 45 μm opening, and the powder of 45 μm or less was used as Eu-activated aluminum-containing silicon nitride powder for synthesizing a fluorescent substance. Further, the Eu-activated aluminum-containing silicon nitride powder obtained was all passed through a sieve of 250 μm opening, obtaining raw material-mixed powder for a β-type sialon fluorescent substance.

(3) Burning Process

The raw material-mixed powder for a β-type sialon fluorescent substance was filled in a cylindrical container made of boron nitride of diameter 60 mm×height 30 mm with a lid (manufactured by Denki Kagaku Kogyo Kabushiki Kaisha, "N-1" grade), and it was heat-treated in an electric furnace with a carbon heater in a pressured nitrogen atmosphere of 0.8 MPa at 2000° C. for 8 hours. The resulting product was a green lump being loosely aggregated, and after cooling to room temperature, it was able to be flaked gently by a hand wearing a clean rubber glove. In this way, after being crushed to a slight degree, it was passed through a sieve of 45 μm opening.

(4) High-temperature Annealing Process

The fluorescent substance powder was filled in a cylindrical container made of boron nitride of diameter 60 mm×height 30 mm with a lid (manufactured by Denki Kagaku Kogyo Kabushiki Kaisha, "N-1" grade), and it was heat-treated again in an electric furnace with a carbon heater in a nitrogen atmosphere of atmospheric pressure at 1800° C. for 8 hours.

(5) Argon Annealing Process

The fluorescent substance powder obtained was heat-treated in an electric furnace with a carbon heater in an argon atmosphere of atmospheric pressure at 1400° C. for 8 hours.

(6) Acid Treatment Process

The powder was heat-treated in a mix acid of 50% hydrofluoric acid and 70% nitric acid by 1:1 at 75° C., thereafter, treated, filtered, washed with water and dried in the same manner as in Example 1, obtaining β-type fluorescent substance powder.

Comparative Example 2

The treatment was conducted to obtain fluorescent substance powder in the same treatment process and condition as in Example 2 except that a high-temperature annealing process and an argon annealing process were omitted.

Comparative Example 3

The treatment was conducted to obtain fluorescent substance powder in the same treatment process and condition as in Example 2 except that a high-temperature annealing process was omitted.

Using a xenon lamp light source dispersed to excitation light, luminescence intensity was measured in the same condition as in Example 1. The results are shown in Table 4.

TABLE 4

| Excitation wavelength: 455 nm | Example 2 | Comparative Example 2 | Comparative Example 3 |
|---|---|---|---|
| Relative peak strength (%) | 170 | 159 | 145 |

It can be seen that luminescence intensity is improved by treatment in a high-temperature annealing process. It can also be seen that luminescence intensity is further improved by combination of a high-temperature annealing process with an argon annealing process.

The present invention has been described on the basis of Example, but this Example is only exemplification, those in the art understand that various modifications are possible and such modifications are within the scope of the present invention.

Although a few embodiments of the present invention have been shown and described, it would be appreciated by those skilled in the art that changes may be made in this embodiment without departing from the principles and spirit of the invention, the scope of which is defined in the claims and their equivalents.

The invention claimed is:

1. A production method of a β-type sialon fluorescent substance containing an optically-active element as a luminescence center in a crystal of nitride or acid nitride:
   a burning process for heat-treating a mixture including silicon nitride, aluminum compound powder and an optically-active element compound;
   a high-temperature annealing process for heat-treating the burned product after cooling under a nitrogen atmosphere;
   a rare-gas annealing process for heat-treating the high-temperature annealed product under a rare gas atmosphere; and
   a process for treating the rare-gas treated product with an acid.

2. A production method of a β-type sialon fluorescent substance containing an optically-active element as a luminescence center in a crystal of nitride or acid nitride:

a nitriding process for heating a mixture including silicon, aluminum compound powder and an optically-active element compound under a nitrogen atmosphere;

a burning process for heat-treating the nitrided metal compound and the optically-active element compound;

a high-temperature annealing process for heat-treating the burned product after cooling under a nitrogen atmosphere;

a rare-gas annealing process for heat-treating the high-temperature annealed product under a rare gas atmosphere; and a process for treating the rare-gas treated product with an acid.

3. The production method of a β-type sialon fluorescent substance according to claim 1, wherein a heat treatment temperature in the high-temperature annealing process is lower than a heating temperature in the burning process.

4. The production method of a β-type sialon fluorescent substance according to claim 1, wherein a heat treatment temperature in the rare-gas annealing process is lower than a heating temperature in the burning process.

5. The production method of a β-type sialon fluorescent substance according to claim 2, wherein a heat treatment temperature in the high-temperature annealing process is lower than a heating temperature in the burning process.

6. The production method of a β-type sialon fluorescent substance according to claim 2, wherein a heat treatment temperature in the rare-gas annealing process is lower than a heating temperature in the burning process.

\* \* \* \* \*